April 14, 1964     C. L. LIGHTFOOT     3,129,271

PROCESSING TECHNIQUES FOR FINE POWDERS

Filed Oct. 18, 1960     2 Sheets-Sheet 1

United States Patent Office 3,129,271
Patented Apr. 14, 1964

3,129,271
PROCESSING TECHNIQUES FOR FINE POWDERS
Charles L. Lightfoot, New Providence, N.J., assignor to Ethylene Corporation, Summit, N.J., a corporation of New Jersey
Filed Oct. 18, 1960, Ser. No. 63,439
1 Claim. (Cl. 204—56)

This invention relates generally to the field of sintering of fine powders, including a variety of finely divided material, including high polymers, powdered metals, ceramics, and cermets. The invention has particular application to high polymers, such as tetrafluoroethylene resins, such as those sold under the trade name "Teflon."

In the prior art, one of the principal difficulties encountered in molding fine powders is the lack of simple and satisfactory means for effecting rapid and even charges. Inefficient charging has been caused by a number of factors, including the low bulk density of fine powders making deep cavities necessary. Deep cavity molds are difficult to charge evenly, especially in molds of small cross section in which it is often practically impossible to effect a full charge.

Another difficulty encountered in the charging of fine powders has been in the flow characteristics of an individual substance, which in turn depends upon grain or molecular structure. In many cases, extremely complicated methods of charging are necessary to take into account the difficult flow characteristics involved.

Other problems include variation of bulk density with extended storage, atmospheric changes, variations of the electrostatic charge on the particles of dielectric powders, and the tendency of many powders to "bridge" or agglomerate.

In spite of the difficulties encountered in molding fine powders, several distinct advantages result from their use, provided that the particle size distribution of the powders is within certain prescribed limits. Among these advantages are closer grain structure in the molded article, reduced molding pressures, shorter sintering cycles, and a generally superior surface finish making in many instances secondary operations on the molding unnecessary.

It is therefore among the principal objects of the present invention to provide an improved method for handling fine powder charges eliminating the above-mentioned difficulties, whereby the handling and depositing of fine powders is materially facilitated.

Still another object of the invention lies in the provision of a method for molding powders, in which the cost of manufacture may be of a reasonably low order, with consequent wide sale, distribution and use.

Still another object of the invention is to provide a method of controlling the thickness of molded parts without resorting to the use of molds with adjustable depth cavities.

A feature of the invention lies in the ready adaptability of the disclosed methods for use with an extremely wide variety of materials in finely powdered form. For example, the method is applicable to polytetrafluoroethylene, high-molecular weight polyolefins, ceramic powders, powdered metals and the like.

These objects and features, as well as other incidental ends and advantages, will more fully appear in the progress of the following disclosure, and be pointed out in the appended claims.

In the drawings, to which reference will be made in the specification, similar reference characters have been employed to designate corresponding parts through the several views.

Figure 1:
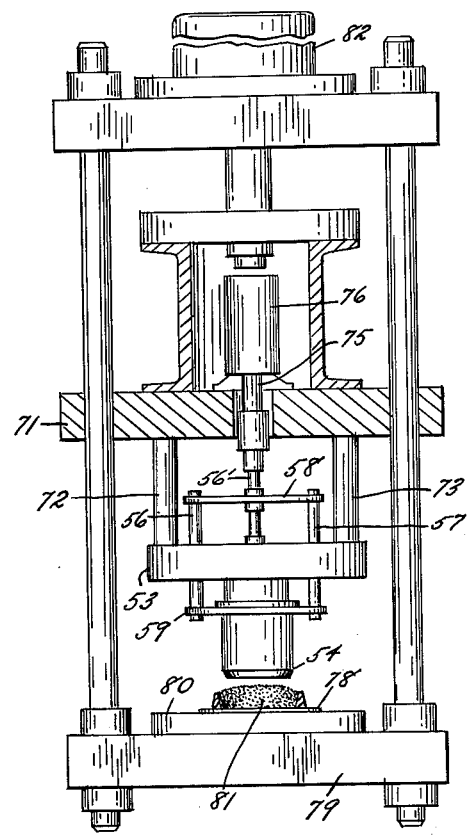
FIGURE 1 is a fragmentary schematic view showing a press and mold used in practicing the invention.
Figure 2:
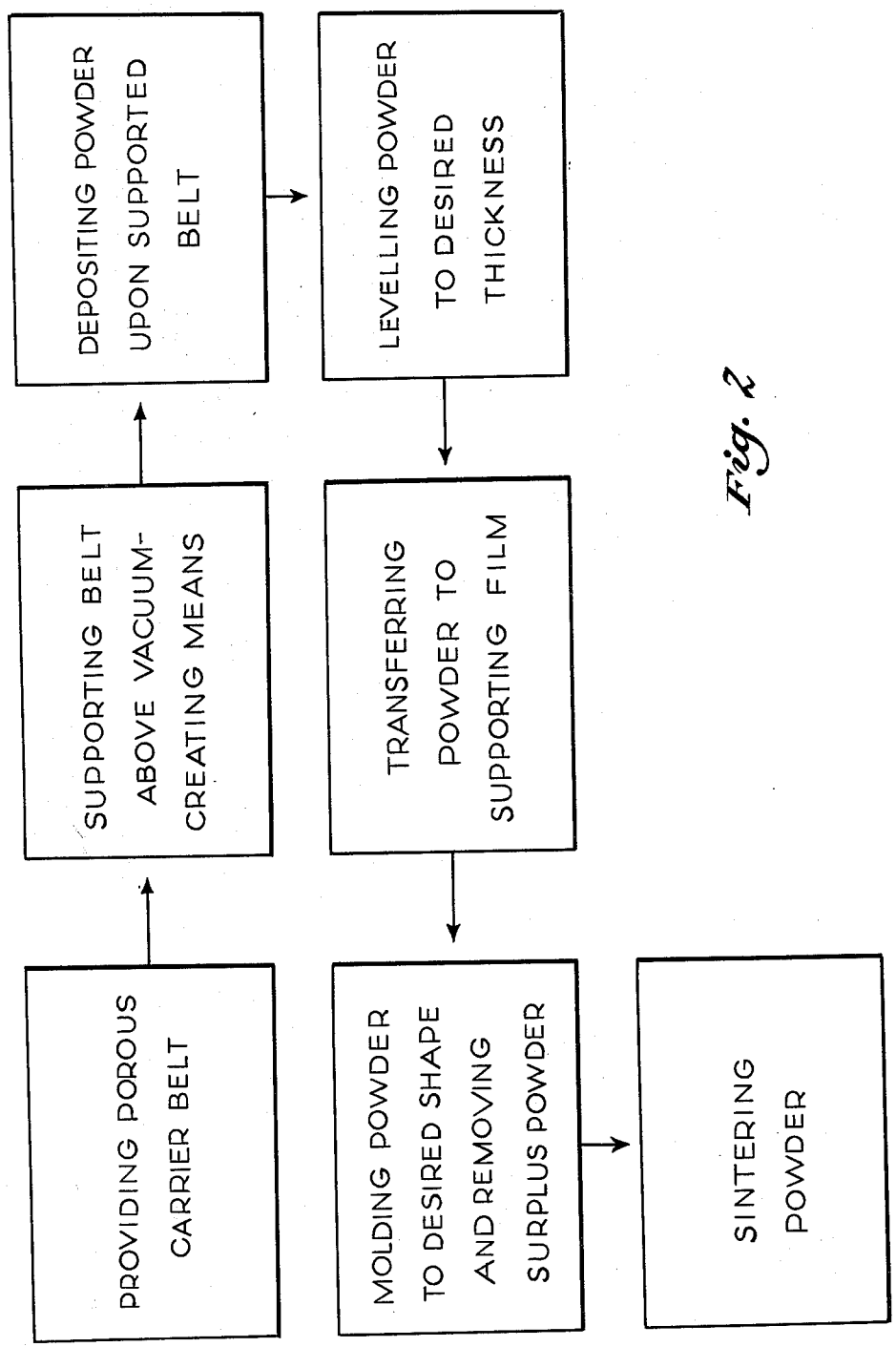
FIGURE 2 is a block diagram illustrating the steps of the disclosed method.

Referring to FIGURE 1, in operation, the mold is mounted on the underside of a moving press platen 71 using parallel members 72 and 73 and strap clamps. The tie rod 56 is connected with the piston rod 75 of a double-acting air cylinder 76. The powder charge is carried on a carrier film 78 over the lower platen 79 of the press. During the molding cycle, the center platen 71 carrying the mold moves downwardly under the influence of a hydraulic ram 82 until the lips 83 of the shells 54 and 55 encounter a flat plate 80. Downward pressure from the air cylinder is just sufficient to keep the shells in the down or normal position against slight pressure tending to raise them; hence, after the shells have contacted the plate 80, the force continues downward relative to the shells until the powder is fully compacted. Movement of the hydraulic ram 82 is now reversed, and simultaneously, connections to the air cylinder 76 are momentarily reversed to cause retraction of the shells 54 and 55 to eject the molded part (not shown). During ejection, a short blast or puff of air is sent through the port 83' to eject any remaining plug of uncompressed powder from the inner shell. This completes a molding cycle, and the carrier film 78 with its now shaped powder charge 81 is repositioned for the next cycle. If desired, the hydraulic pressure cycle, air cylinder cycle and the positioning of the charge may be automated and synchronized through a timer (not shown), so that this phase of the process may require no manual control.

With the ejection of the molded piece back on to the carrier film 78, the same passes from the lower press platen 79 to a vacuum "clean-up" plate (not shown), where excess powder is removed by vacuum cleaning and is returned to storage pneumatically. The molded parts are now sintered and subject to any secondary operations that are required.

Reference is now made to the method of charging, leveling and transporting the powder as used in this process. Powder is deposited upon an endless fabric belt which is intermittently drawn over a vacuum plate under a leveling knife. The levelling knife is fitted with a vacuum pickup incorporated therein (not shown) for returning excess powder shaved from the charge to the process stream. The knife may also be fitted with a small vibrator to facilitate the leveling operation. The height of the leveling knife is adjustable to permit adjusting the charge to any desired depth.

I wish it to be understood that I do not consider the invention limited to the precise details of structure shown and set forth in this specification, for obvious modifications will occur to those skilled in the art to which the invention pertains.

I claim:

In a method of molding and sintering fine powder into a finished article, the steps of: (1) providing a flexible planar porous carrier belt; (2) supporting said carrier belt above a vacuum-creating means to provide a pressure differential between opposed surfaces of said belt; (3) depositing said powder upon said carrier belt whereby the same is at least partially compacted upon said belt; (4) leveling said partially compacted powder to desired thickness; (5) transferring said partially compacted and leveled powder to a non-porous, smooth surfaced supporting film; (6) subjecting said powder to the action of a mold to yield a compacted preform; (7) separating said compacted preforms from the unmolded surplus powders; (8) sintering said preforms.

(References on following page)

References Cited in the file of this patent

UNITED STATES PATENTS

| | | | |
|---|---|---|---|
| 871,524 | Pulvermann | Nov. 19, | 1907 |
| 1,754,502 | Denmire | Apr. 15, | 1930 |
| 2,134,366 | Hardy | Oct. 25, | 1938 |
| 2,294,555 | Hendrie | Sept. 1, | 1942 |
| 2,297,504 | Salvaneschi | Sept. 29, | 1942 |
| 2,593,667 | Gora | Apr. 22, | 1952 |
| 2,689,974 | Meyer | Sept. 24, | 1954 |
| 2,700,177 | Mottet | Jan. 25, | 1955 |
| 2,913,773 | Hassel | Nov. 24, | 1959 |
| 2,951,260 | Harrison et al. | Sept. 6, | 1960 |
| 2,960,727 | Bradshaw et al. | Nov. 22, | 1960 |

FOREIGN PATENTS

| | | | |
|---|---|---|---|
| 773,375 | Great Britain | Apr. 24, | 1957 |